Aug. 12, 1952  R. CAIRNS  2,606,757
AIR CUSHION SPRING SUSPENSION
Filed May 8, 1951

INVENTOR
ROBERT CAIRNS
Douglas S. Johnson
ATTY.

Patented Aug. 12, 1952

2,606,757

UNITED STATES PATENT OFFICE 2,606,757

AIR CUSHION SPRING SUSPENSION

Robert Cairns, Toronto, Ontario, Canada

Application May 8, 1951, Serial No. 225,154

5 Claims. (Cl. 267—31)

This invention relates to a spring suspension and the principal object is to provide such a suspension in which the spring action is effectively cushioned with air to absorb heavier shocks and impacts without requiring excessive spring stiffness to enable the use of a spring element capable in itself of absorbing and cushioning the lighter pressures and impacts.

A further object is to enable spring recovery to be retarded under air pressure following impact to facilitate dissipation of impact force.

Still a further object is to provide a spring suspension as aforesaid of relatively simple and inexpensive construction to replace standard spring suspension and shock absorber units on motor vehicles.

The principal feature of the invention resides in suspending a load-carrying leaf spring element from within a channel to flex between an unloaded position arching above the channel walls and a loaded position adjacent the channel bottom, the spring being formed to engage the channel walls when moving into the channel in snug edge sealing relation to define with the channel a compression chamber having restricted communication with the atmosphere beneath the ends of the spring.

A further feature consists in combining with the spring element a resilient edge sealing member to maintain pressure in the compression chamber against escape past the edges of the spring.

These and other objects and features will become apparent with reference to the accompanying drawings in which.

Figure 1:
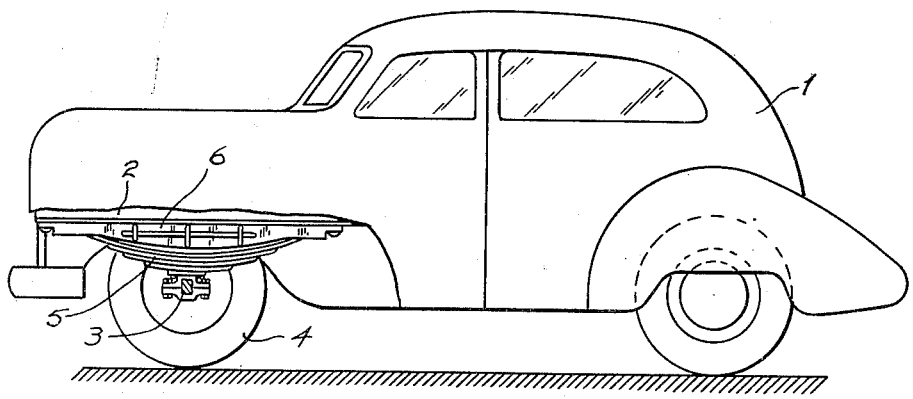
Figure 1 is an elevational view of an automobile partly broken away depicting the application of the present invention.

With reference to the drawings, the automobile 1 is shown as having a main frame bar 2 from which the axle 3 carrying the wheels 4 is suspended.

The device forming the spring suspension is shown in detail in Figures 2 to 5 and comprises a spring element generally designated as 5 operating in a channel 6 secured to the frame bar 2 by the bolts 7. The spring element 5 is made up of a plurality of leaves 8 according to the desired spring stiffness bolted to the main spring element 9 which is formed with angularly bent ends 10 sliding on the base of the channel 6 beneath the suspension brackets 11.

The spring element 9 is free to slide under flexing as guided by the channel base and brackets 11, and both the spring 9 and brackets are shown provided with wear shoes 12 and 13 respectively. The spring 9 and channel 6 are ground for maximum tightness, and it will be seen that the spring in moving into the channel from the position of Figure 2 to the position of Figure 3 defines a compression chamber 15 which is progressively diminishing under inward spring movement.

Since the spring 9 is in tight edge sealing contact with the channel walls 16 the escape of air is restricted substantially entirely to flow out beneath the spring ends 10. It will be appreciated that the compressive force on the spring acts to urge these ends 10 against the channel bottom while the air pressure within the chamber 15 acts to urge the ends 10 away from the channel bottom to permit escape of the air.

There is thus a self-regulating effect produced with pressures in the chamber 15 being increased automatically to cushion larger impact forces on the spring.

Air escaping from beneath the spring ends 10 is free to escape through openings 17 which are in communication with the atmosphere.

In the particular illustration the load is imparted to the spring element 5 through the spring seat bracket 18 which is secured to the spring element and carries the axle 3.

To further increase the seal of the compression chamber 15 at the edges of the spring element a resilient or rubber material 19 is utilized. In the illustration this element 19 is in the form of a flat wiper element extending the full width of the spring 9, and it will be appreciated that pressure of the chamber will expand it into sealing engagement with the channel walls 16 under inward spring movement.

If desired rubber may also be bonded to the edges of the spring 19 to resiliently engage the channel walls. The channel is preferably ribbed for rigidity and is shown with a longitudinal rib 20 and vertical stiffening ribs 21.

Figure 2:
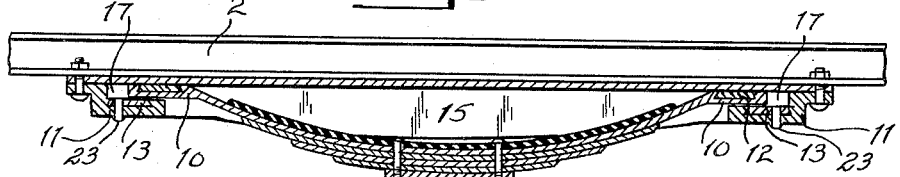
Figure 2 is an enlarged vertical cross sectional view of the suspension in normal relatively lightly loaded position.
Figure 3:
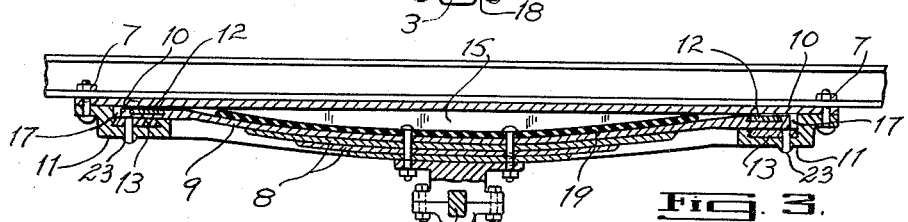
Figure 3 is a view similar to Figure 2 but showing the spring element depressed under a load.
Figure 4:
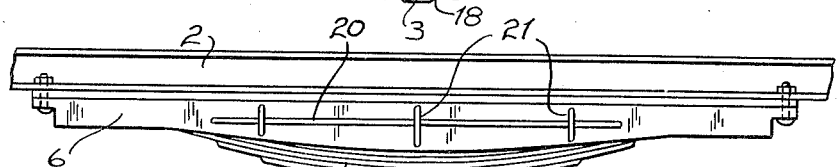
Figure 4 is an enlarged elevational detail and Figure 5 is an enlarged transverse cross sectional detail.
Figure 5:
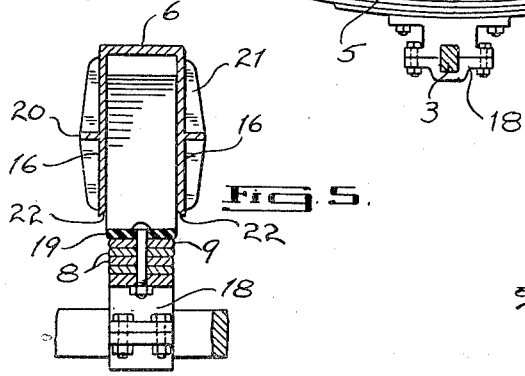

In the normal position of Figure 2 with the spring unloaded it will be appreciated that the entire spring element 5 projects below the wall 16 of the channel, providing for free entry of air therein. As the spring moves inwardly it is guided by the chamfered edges 22 of the walls 16 into the channel to form the expansion chamber 15 which provides the cushioning effect described.

When impact is completed the spring moves outwardly which in turn creates a reduced pressure in the chamber 15 which can only be normalized through introduction of air through restricted flow between the spring ends 10 and the channel base, permitting relatively slow outward spring movement. This outward retardation of spring movement effectively damps and facilitates dissipation of the reactive spring thrust.

If desired one of the ends 10 of the spring may be anchored but it has been found that the spring maintains a centralized position with both ends freely sliding in unison under spring movement.

With the air cushioning effect obtained on inward spring movement and the retardation of outward spring movement it will be appreciated that the single spring arrangement provides both for spring suspension and shock absorption.

Since the larger or ultimate impact loads are supported or absorbed by an air cushion in the chamber 15, it will be appreciated that the spring element 5 itself may be made of the requisite stiffness to give the initial spring flexibility without undesirably lowering its load capacity in ultimate impact. This spring may be lubricated through suitable grease fittings 23 and the construction of the suspension brackets 11 and the other structural details may be altered as desired without departing from the scope of the invention.

What I claim as my invention is:

1. A suspension spring construction, comprising an inverted channel having parallel depending side walls, and an arched spring element supported at the ends within the channel and flexing between said walls in edge wiping contact therewith to define a variable air chamber within said channel having restricted communication with the atmosphere above the ends of said spring.

2. A suspension spring assembly, comprising an inverted channel having parallel depending side walls, a broad leaf spring element supported by the ends within said channel and flexing in snug edge wiping contact with said parallel walls to define a variable air chamber within said channel, the ends of said spring sliding freely in said channel and separating under pressure in said chamber from said channel to permit restricted air flow between said channel and spring ends, said channel at the ends of said spring being open to the atmosphere, and a spring seat bracket secured to said spring element.

3. A device as claimed in claim 2 in which said spring element carries a flexible material wiping on said channel walls at the edges of said spring element to form an edge air seal.

4. A flexible spring suspension, comprising an inverted channel having depending parallel walls, a pair of brackets forming spaced opposed support shelves at the ends of the channel bottom, a leaf spring element arched between said brackets and flexing in snug edge wiping contact with said parallel walls to define a variable air chamber within said channel and having angularly turned ends sliding on said channel bottom in close sliding proximity with the shelves and affording upon separating under air pressure in said chamber from said channel bottom against said shelves, restricted air flow passages between said ends and channel bottom, said channel being open to the atmosphere at the ends of said spring, and a spring seat bracket secured to said spring element.

5. A device as claimed in claim 4 in which said spring element is formed to arch below said walls with load removed and said walls have their inner free edges chamfered to guide said spring therebetween in centralized movement into said channel under loading, said spring carrying a flexible material exposed at the edges thereof to engage said walls in resilient wiping contact under spring movement into and out of said channel.

ROBERT CAIRNS.

REFERENCES CITED

The following references are of record in the file of this patent:

UNITED STATES PATENTS

| Number | Name | Date |
|---|---|---|
| 1,792,876 | Stout | Feb. 17, 1931 |
| 1,991,184 | Towner | Feb. 12, 1935 |

FOREIGN PATENTS

| Number | Country | Date |
|---|---|---|
| 664,698 | France | Apr. 29, 1929 |